US010833739B2

(12) United States Patent
Fakoorian et al.

(10) Patent No.: US 10,833,739 B2
(45) Date of Patent: Nov. 10, 2020

(54) REFERENCE SIGNAL AND TX/RX PRECODING FOR UE MULTIPLEXING IN NR SS

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US); Siddhartha Mallik, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/447,280

(22) Filed: Jun. 20, 2019

(65) Prior Publication Data

US 2019/0305834 A1     Oct. 3, 2019

Related U.S. Application Data

(63) Continuation of application No. 15/932,312, filed on Feb. 16, 2018, now Pat. No. 10,333,595.

(Continued)

(51) Int. Cl.
*H04B 7/04*      (2017.01)
*H04B 7/0456*    (2017.01)
(Continued)

(52) U.S. Cl.
CPC ............. *H04B 7/0456* (2013.01); *H04B 7/00* (2013.01); *H04B 7/022* (2013.01); *H04B 7/0854* (2013.01); *H04L 5/0007* (2013.01); *H04L 5/0048* (2013.01)

(58) Field of Classification Search
CPC ........ H04B 7/0456; H04B 7/00; H04B 7/022; H04B 7/0854; H04L 5/0007; H04L 5/0048
See application file for complete search history.

(56) References Cited

U.S. PATENT DOCUMENTS 9,401,790 B2    7/2016  Park et al.
1,033,359 A1    6/2019  Fakoorian et al.
(Continued)

FOREIGN PATENT DOCUMENTS

EP            3110222 A1    12/2016
WO    WO-2011153286 A1    12/2011

OTHER PUBLICATIONS

International Search Report and Written Opinion—PCT/US2018/018814—ISA/EPO—dated May 15, 2018.

*Primary Examiner* — Jean B Corrielus
(74) *Attorney, Agent, or Firm* — Qualcomm Incorporated

(57) ABSTRACT

Reference signal and transmitter (Tx)/receiver (Rx) precoding for user equipment (UE) multiplexing in new radio (NR) shared spectrum networks is discussed. In certain reference signals, a base station may schedule multiple UEs for transmission of uplink reference signals within an identified subframe. The base station may transmit a reference signal configuration message, wherein the reference signal configuration message includes a transmission sequence identifier identifying a multiplexing for antenna ports assigned for transmission of the uplink reference signals. The multiplexing may be one or both of frequency divisional multiplexing (FDM) and time division multiplexing (TDM) over the identified subframe. Additional reference signals, transmit precoders may be identified by the base station based on channel inversion calculations of the channel matrix determined based on uplink reference signals.

20 Claims, 8 Drawing Sheets

Related U.S. Application Data

(60) Provisional application No. 62/461,510, filed on Feb. 21, 2017.

(51) Int. Cl.
  *H04B 7/08* (2006.01)
  *H04B 7/00* (2006.01)
  *H04B 7/022* (2017.01)
  *H04L 5/00* (2006.01)

(56) References Cited

U.S. PATENT DOCUMENTS

| | | |
|---|---|---|
| 2010/0075706 A1 | 3/2010 | Montojo et al. |
| 2010/0142466 A1 | 6/2010 | Palanki et al. |
| 2013/0301452 A1* | 11/2013 | Yoon ............... H04W 72/0413 370/252 |
| 2014/0348063 A1* | 11/2014 | Kang ................. H04W 4/70 370/328 |
| 2015/0043457 A1* | 2/2015 | Liu .................. H04B 7/024 370/329 |
| 2015/0222402 A1* | 8/2015 | Ouchi ............. H04W 72/0446 370/329 |
| 2017/0195976 A1 | 7/2017 | Goto et al. |
| 2017/0280454 A1 | 9/2017 | Kusashima et al. |

\* cited by examiner

REFERENCE SIGNAL AND TX/RX PRECODING FOR UE MULTIPLEXING IN NR SS

CROSS-REFERENCE TO RELATED APPLICATIONS

This application is a Continuation of U.S. patent application Ser. No. 15/932,312 (now U.S. Pat. No. 10,333,595), entitled "REFERENCE SIGNAL AND TX/RX PRECODING FOR UE MULTIPLEXING IN NR SS," filed on Feb. 16, 2018, and claims the benefit of U.S. Provisional Patent Application No. 62/461,510, entitled, "REFERENCE SIGNAL AND TX/RX PRECODING FOR UE MULTIPLEXING IN NR SS," filed on Feb. 21, 2017, which are expressly incorporated by reference herein in their entirety.

BACKGROUND

Field

Aspects of the present disclosure relate generally to wireless communication systems, and more particularly, to reference signal and transmitter (Tx)/receiver (Rx) precoding for user equipment (UE) multiplexing in new radio (NR) shared spectrum networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes scheduling, by a base station, a plurality of UEs for transmission of one or more uplink reference signals within an identified subframe, transmitting, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of frequency divisional multiplexing (FDM) and time division multiplexing (TDM) over the identified subframe, and receiving, at the base station, a plurality of uplink reference signals in the identified subframe from one or more of the plurality of UEs according to the scheduling.

In an additional aspect of the disclosure, a method of wireless communications include estimating, by a base station, a channel matrix based on one or more uplink reference signals received by one or more UEs served by the base station, calculating, by the base station, a channel inversion matrix resulting from a conjugate transpose of the channel matrix multiplied by an inversion of a product of the channel matrix multiplied by the conjugate transpose of the channel matrix, selecting, by the base station, corresponding column vectors of the channel inversion matrix of the calculating corresponding to each of the one or more UEs, applying, by the base station, a singular value decomposition to the selected corresponding column vectors to obtain a signal-to-leakage ratio (SLR) precoder matrix, identifying, by the base station, a transmit precoder of the one of the one or more UEs as a rank value number of smallest left singular vectors of the SLR precoder matrix, and transmitting, by the base station, data to the one of the one or more UEs precoded using the transmit precoder.

In an additional aspect of the disclosure, an apparatus configured for wireless communication include means for scheduling, by a base station, a plurality of UEs for transmission of one or more uplink reference signals within an identified subframe, means for transmitting, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, and means for receiving, at the base station, a plurality of uplink reference signals in the identified subframe from one or more of the plurality of UEs according to the scheduling.

In an additional aspect of the disclosure, an apparatus configured for wireless communication include means for estimating, by a base station, a channel matrix based on one or more uplink reference signals received by one or more UEs served by the base station, means for calculating, by the base station, a channel inversion matrix resulting from a conjugate transpose of the channel matrix multiplied by an inversion of a product of the channel matrix multiplied by the conjugate transpose of the channel matrix, means for selecting, by the base station, corresponding column vectors of the channel inversion matrix of the calculating corresponding to each of the one or more UEs, means for applying, by the base station, a singular value decomposition to the selected corresponding column vectors to obtain a SLR precoder matrix, means for identifying, by the base station, a transmit precoder of the one of the one or more UEs as a rank value number of smallest left singular vectors of the SLR precoder matrix, and means for transmitting, by the base station, data to the one of the one or more UEs precoded using the transmit precoder.

In an additional aspect of the disclosure, a non-transitory computer-readable medium having program code recorded thereon. The program code further includes code to schedule, by a base station, a plurality of UEs for transmission of one or more uplink reference signals within an identified subframe, code to transmit, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, and code to receive, at the base station, a plurality of uplink reference signals in the identified subframe from one or more of the plurality of UEs according to the scheduling.

In an additional aspect of the disclosure, a non-transitory computer-readable medium having program code recorded thereon. The program code further includes code to estimate, by a base station, a channel matrix based on one or more uplink reference signals received by one or more UEs served by the base station, code to calculate, by the base station, a channel inversion matrix resulting from a conjugate transpose of the channel matrix multiplied by an inversion of a product of the channel matrix multiplied by the conjugate transpose of the channel matrix, code to select, by the base station, corresponding column vectors of the channel inversion matrix of the calculating corresponding to each of the one or more UEs, code to apply, by the base station, a singular value decomposition to the selected corresponding column vectors to obtain a SLR precoder matrix, code to identify, by the base station, a transmit precoder of the one of the one or more UEs as a rank value number of smallest left singular vectors of the SLR precoder matrix, and code to transmit, by the base station, data to the one of the one or more UEs precoded using the transmit precoder.

In an additional aspect of the disclosure, an apparatus configured for wireless communication is disclosed. The apparatus includes at least one processor, and a memory coupled to the processor. The processor is configured to schedule, by a base station, a plurality of UEs for transmission of one or more uplink reference signals within an identified subframe, to transmit, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, and to receive, at the base station, a plurality of uplink reference signals in the identified subframe from one or more of the plurality of UEs according to the scheduling.

In an additional aspect of the disclosure, an apparatus configured for wireless communication is disclosed. The apparatus includes at least one processor, and a memory coupled to the processor. The processor is configured to estimate, by a base station, a channel matrix based on one or more uplink reference signals received by one or more UEs served by the base station, to calculate, by the base station, a channel inversion matrix resulting from a conjugate transpose of the channel matrix multiplied by an inversion of a product of the channel matrix multiplied by the conjugate transpose of the channel matrix, to select, by the base station, corresponding column vectors of the channel inversion matrix of the calculating corresponding to each of the one or more UEs, to apply, by the base station, a singular value decomposition to the selected corresponding column vectors to obtain a SLR precoder matrix, to identify, by the base station, a transmit precoder of the one of the one or more UEs as a rank value number of smallest left singular vectors of the SLR precoder matrix, and to transmit, by the base station, data to the one of the one or more UEs precoded using the transmit precoder.

In one aspect of the disclosure, a method of wireless communication includes scheduling, by a base station, a plurality of UEs for transmission of one or more uplink reference signals within an identified subframe, transmitting, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of frequency divisional multiplexing (FDM) and time division multiplexing (TDM) over the identified subframe, signaling, by the base station, a virtual cell identifier (ID) to each of the plurality of UEs identifying an associated cell group assigned to each of the plurality of UEs, wherein the associated cell group is served by a combination of the base station and one or more neighbor base stations, and receiving, at the base station, a plurality of uplink reference signals in the identified subframe from one or more of the plurality of UEs, wherein the plurality of uplink reference signals are identified according to the virtual cell ID and the scheduling.

In an additional aspect of the disclosure, an apparatus configured for wireless communication include means for scheduling, by a base station, a plurality of UEs for transmission of one or more uplink reference signals within an identified subframe, means for transmitting, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, means for signaling, by the base station, a virtual cell ID to each of the plurality of UEs identifying an associated cell group assigned to each of the plurality of UEs, wherein the associated cell group is served by a combination of the base station and one or more neighbor base stations, and means for receiving, at the base station, a plurality of uplink reference signals in the identified subframe from one or more of the plurality of UEs, wherein the plurality of uplink reference signals are identified according to the virtual cell ID and the means for scheduling.

In an additional aspect of the disclosure, a non-transitory computer-readable medium having program code recorded thereon. The program code further includes code to schedule, by a base station, a plurality of UEs for transmission of one or more uplink reference signals within an identified subframe, code to transmit, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, code to signal, by the base station, a virtual cell ID to each of the plurality of UEs identifying an associated cell group assigned to each of the plurality of UEs, wherein the associated cell group is served by a combination of the base station and one or more neighbor base stations, and code to receive, at the base station, a plurality of uplink reference signals in the identified subframe from one or more of the plurality of UEs, wherein the plurality of uplink reference signals are identified according to the virtual cell ID and the code to schedule.

In an additional aspect of the disclosure, an apparatus configured for wireless communication is disclosed. The apparatus includes at least one processor, and a memory coupled to the processor. The processor is configured to schedule, by a base station, a plurality of UEs for transmission of one or more uplink reference signals within an identified subframe, to transmit, by the base station, a reference signal configuration message, wherein the reference signal configuration message includes a transmission sequence identifier identifying a multiplexing for one or more antenna ports assigned for transmission of the one or more uplink reference signals by the plurality of UEs, and wherein the multiplexing is one or both of FDM and TDM over the identified subframe, to signal, by the base station, a virtual cell ID to each of the plurality of UEs identifying an associated cell group assigned to each of the plurality of UEs, wherein the associated cell group is served by a combination of the base station and one or more neighbor base stations, and to receive, at the base station, a plurality of uplink reference signals in the identified subframe from one or more of the plurality of UEs, wherein the plurality of uplink reference signals are identified according to the virtual cell ID and the configuration of the at least one processor to schedule.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
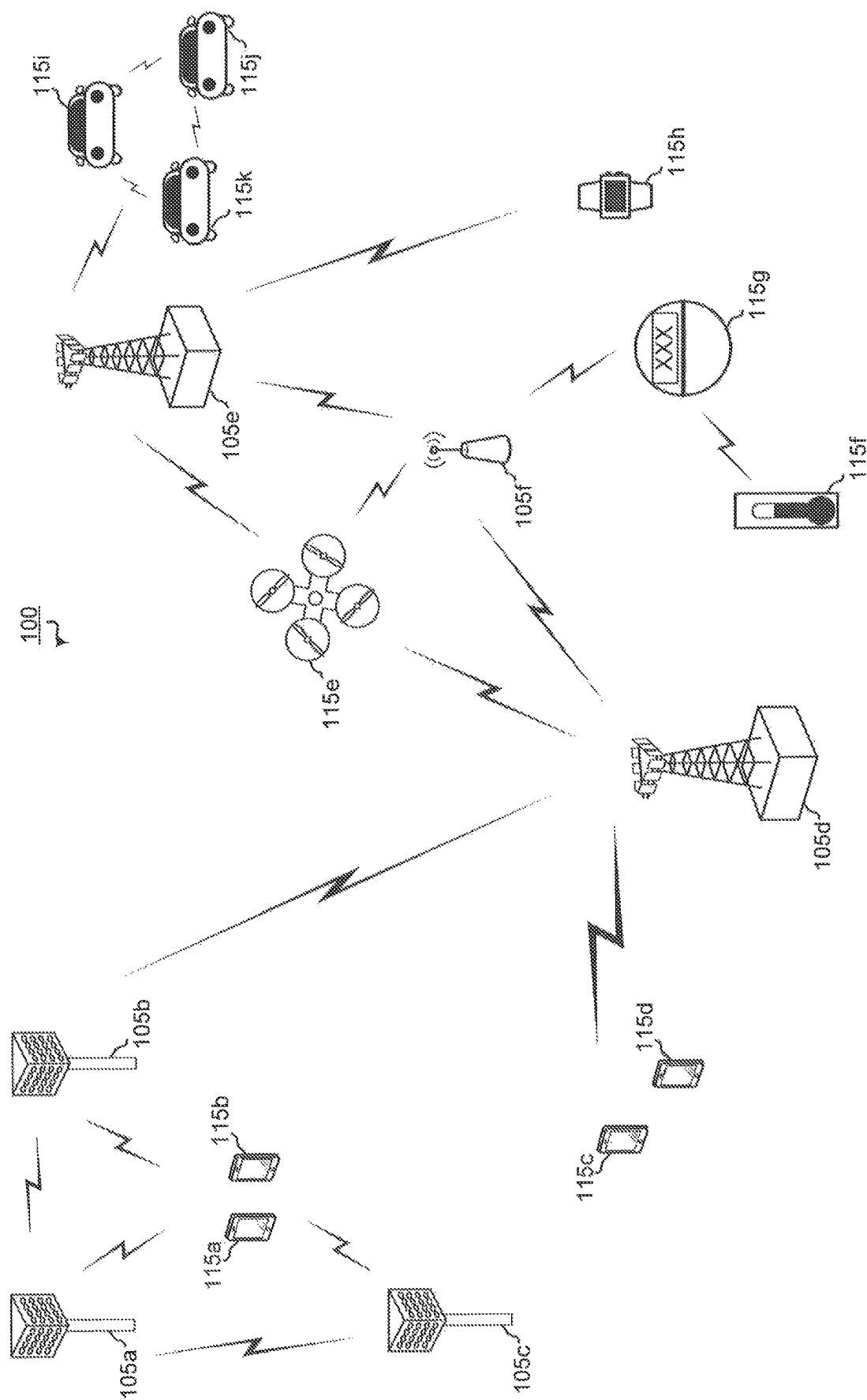
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., 99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
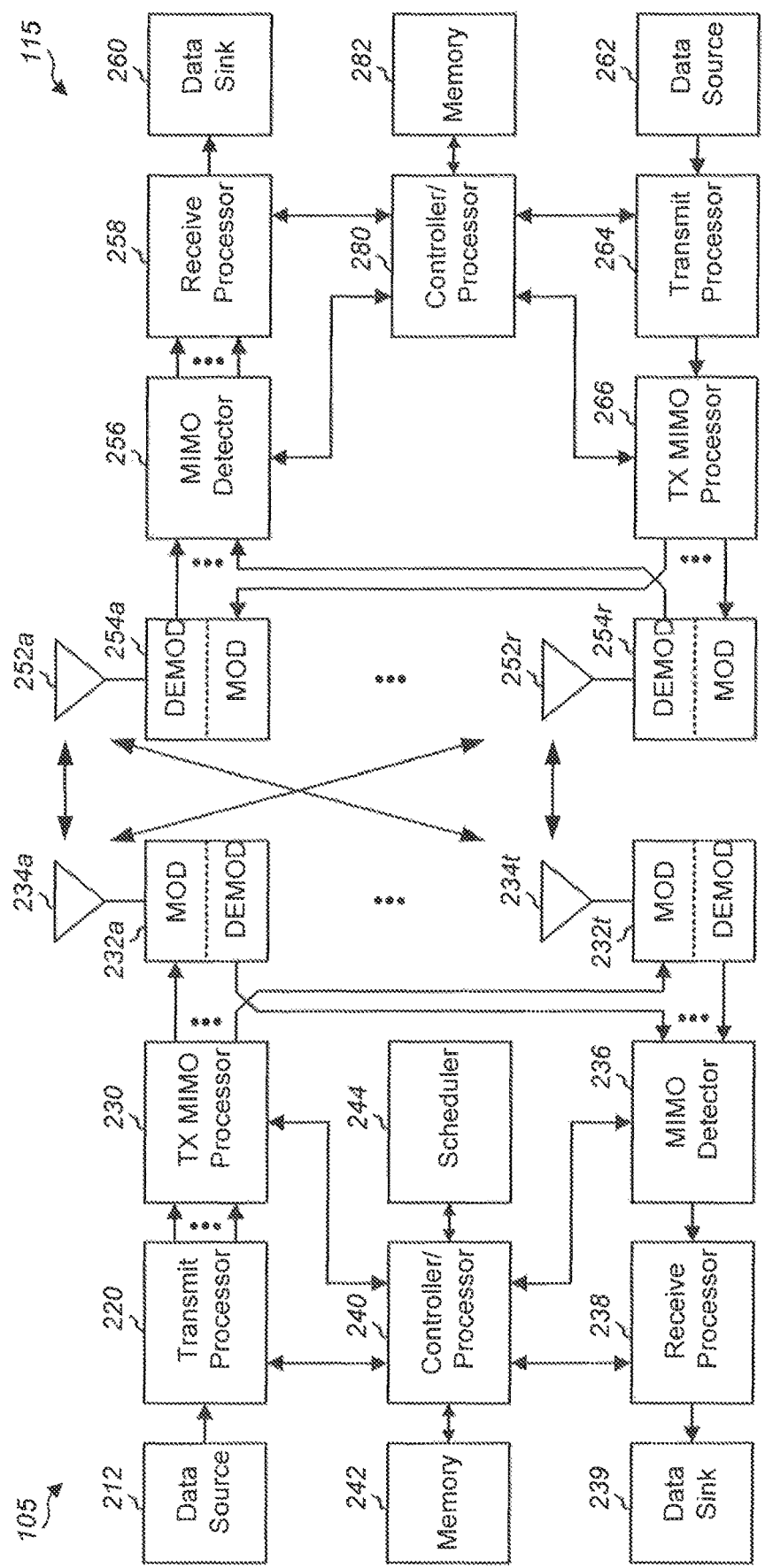
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A, 5, and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
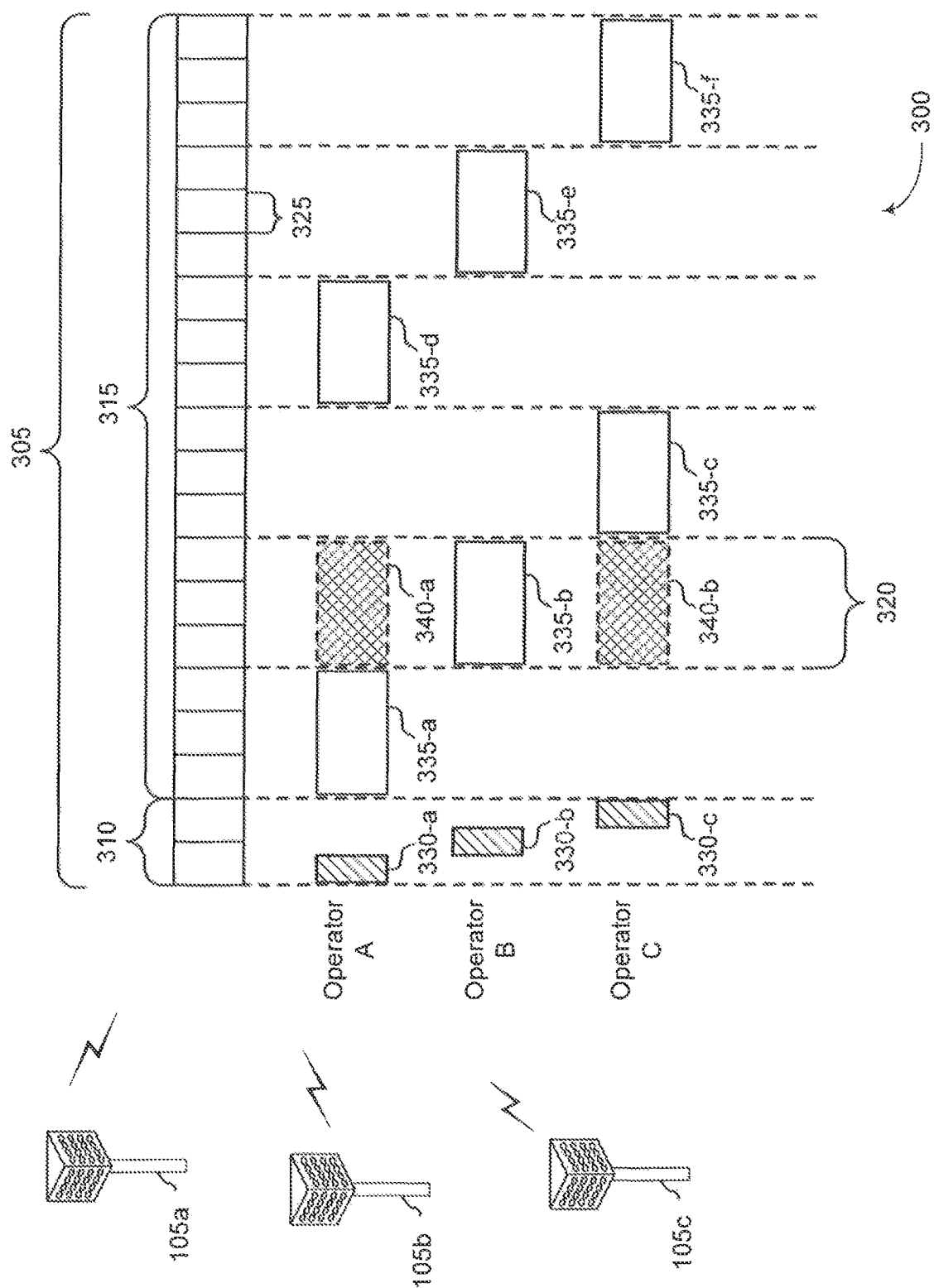
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals).

In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In LTE, sounding reference signal (SRS) transmission per antenna port may be facilitated using a cyclic shift $\alpha_{\tilde{p}}$ of a base sequence:

$$\alpha_{\tilde{p}} = 2\pi \frac{n_{SRS}^{cs,\tilde{p}}}{8}, n_{SRS}^{cs,\tilde{p}} = \left(n_{SRS}^{cs} + \frac{s\tilde{p}}{N_{ap}}\right) \bmod 8$$

where $n_{SRS}^{cs} \in \{0, 1, \ldots, 7\}$ is configured by higher layers for each UE, and $\tilde{p} \in \{0, 1, \ldots, N_{ap}-1\}$, $N_{ap}$ is the number of antenna ports used for sounding reference signal transmission. The base sequence generation follows common rules for uplink reference signals.

It should be noted that, for SRS, the base sequence is a function of the physical cell identifier (ID), as a virtual cell ID is not defined for SRS.

SRS can be scheduled in a variety of different formats. For example, SRS may be periodic (scheduled through RRC signaling) or aperiodic (scheduled through the uplink grant) as often as every second subframe (e.g., 2 ms) or as infrequently as every 16$^{th}$ frame (e.g., 160 ms). SRS may be wideband (e.g., a non-frequency-hopped SRS), in which the SRS covers the bandwidth of interest in a single SC-FDMA symbol. SRS may also be narrowband (e.g., frequency-hopped SRS), in which the SRS is transmitted in multiple symbols where, within each symbol, only a portion of the bandwidth of interest is covered. In the time domain, the SRS may be transmitted in the last symbol of the subframe, while in the frequency domain, the SRS symbols may be mapped to every other tone, such as in a comb pattern.

Multiplexing of SRS signals is currently handled via time division multiplexing (TDM) and frequency division multiplexing (FDM). In TDM, SRS from different UEs are scheduled in different subframes, while, in FDM, different sequences have different starting points in the frequency domain for a comb pattern or in general different narrowbands. Different UEs having SRS in the same time/frequency resource may generally begin with the same base sequences that are shifted according to different cyclic shifts corresponding to the UEs.

One option that may be available for generating SRS in a NR-SS network would be to adopt the legacy LTE procedures. For example, the positioning of SRS transmissions, for some coordinated multipoint (CoMP) purposes like UE scheduling, may move the SRS transmission to the first OFDM symbol(s) of the subframe, or in the middle or last OFDM symbol(s) too. SRS transmissions can also be un-precoded per antenna or precoded per layer. The SRS antenna ports among the scheduled UEs can be multiplexed using FDM, TDM, or cyclic shift-based multiplexing. When using FDM, the number of comb patterns may be increased from the legacy formats of two comb patterns. For example, there may be three comb patterns defined with SRS on every 3$^{rd}$ subcarrier.

Additionally, the standards may introduce more OFDM symbols for each SRS transmission that may be applied using code divisional multiplexing (CDM), in either TDM or FDM, while different cyclic shifts may further be used in multiplexing. A virtual cell ID may also be used, similar to uplink CoMP for demodulation reference signals (DMRS), where UEs with different physical cell IDs can have the same base sequence. Various combinations of such different aspects may also be used. With legacy LTE design of two comb patterns and eight cyclic shifts, 16 antenna ports can be multiplexed within only one SRS transmission (one OFDM symbol).

Figure 4:
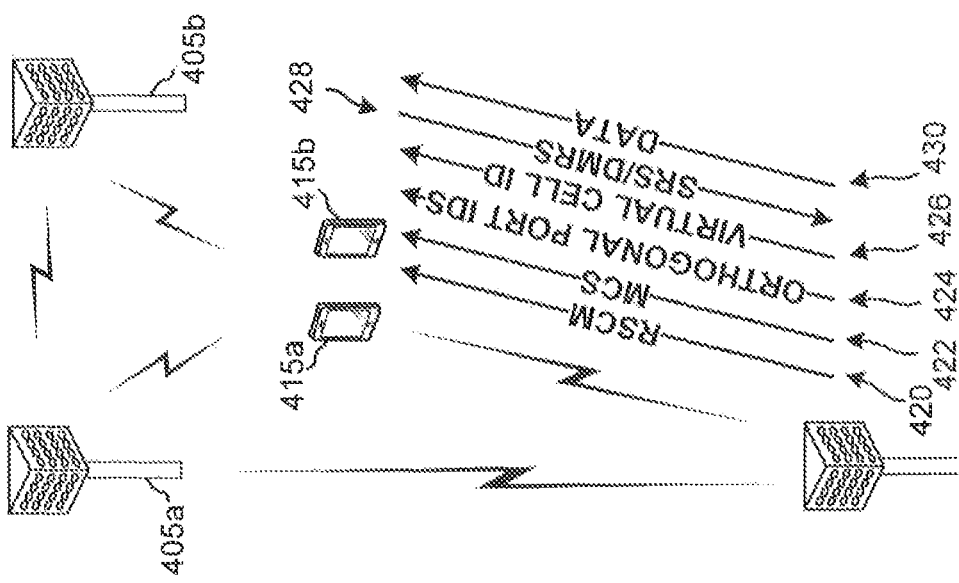
FIG. 4A is a block diagram illustrating wireless communications according to aspects of the present disclosure.
FIG. 4B is an example of a timing diagram illustrating uplink reference signal multiplexing according to aspects of the present disclosure.

Referring to FIGS. 4A and 4B, various aspects of the present disclosure provide for an alternative option, in which a high density SRS is defined in which the SRS antenna ports among the scheduled UEs can be FDM and/or TDM multiplexed. Optional aspects may also provide for CDM (in time and/or frequency) that can be applied on top of the FDM and/or TDM. Accordingly, one or more of base stations 405A-405C may exchange signals with UEs 415A and 415B in order to support multiplexing for antenna ports assigned for transmission of uplink reference signals by UEs 415A and 415B. For example, base station 405c may transmit a reference signal configuration message at 420, and this message may include a transmission sequence identifier that identifies the multiplexing, over an identified subframe, for the antenna ports assigned for transmission of the uplink reference signals by the UEs.

In additional options, where the same time/frequency SRS resources are used, different ports may be multiplexed with different cyclic shifts. In this option, a virtual cell ID may be used, where UEs with different physical cell IDs can have the same base sequence. Further options may provide combinations of the above aspects to generate the SRS within NR-SS networks. Accordingly, the base station 405c may include a cyclic shift set in the reference signal configuration message transmitted at 420 and the UEs may employ this cyclic shift set to generate the uplink reference signals.

In LTE, a DMRS sequence may be defined in the middle (e.g., $4^{th}$ symbol for normal CP) of each slot $n_s$. In a slot $n_s$, DMRS per layer $\lambda$ is obtained by using a cyclic shift $\alpha_\lambda$ of a base sequence $$\alpha_\lambda = 2\pi \frac{n_{cs,\lambda}}{12}$$

$$n_{cs,\lambda} = (n_{DMRS}^{(1)} + n_{DMRS,\lambda}^{(2)} + n_{PN}(n_s))$$

where $n_{DMRS}^{(1)}$ is cell specific and provided by higher layers, $n_{PN}(n_s)$ is cell specific and is a function of slot index $n_s$, cell-ID, or higher layer parameters, and $n_{DMRS,\lambda}^{(2)}$ is UE-specific, provided in the uplink grant, and represents a cyclic shift for layer $\lambda$. The base sequence generation follows common rules for uplink reference signals.

It should be noted that, for uplink DMRS, base sequence is a function of physical cell ID or virtual cell ID in the case of CoMP. The length of the DMRS sequence per layer equals the number of allocated tones per OFDM symbol for uplink data. Unlike SRS, there are no comb patterns defined for DMRS.

Multiplexing of DMRS from different UEs in the same time/frequency resources may be implemented by starting with the same base sequences but multiplexing using different cyclic shifts. With the additional application of CDM in time across two DMRS sequences in a subframe, eight UEs, each with two layers or four UEs each with four layers can be multiplexed. Such aspects assume that channels are separable. This approach will work for both SC-FDMA and OFDMA, in which support of SC-FDMA may be beneficial for extended coverage UEs and single layers.

One option for providing uplink DMRS design in NR SS networks may adopt the legacy LTE procedures for DMRS generation. For example, the position of DMRS may be in the first OFDM symbols (e.g., for short PUSCH) or in the middle of slot (e.g., for regular PUSCH). DMRS transmissions may be precoded per layer with multiplexing applied by UE or layer assigned for transmission. Multiplexing may also include application of different cyclic shifts, in which a virtual cell ID may be supported for uplink CoMP in order to accommodate the same base sequences for all UEs. TDM and/or CDM may further be applied in the time domain over different DMRS symbols. Optional solutions may further include various combinations of such features as well.

It should further be noted that the orthogonal ports assigned to each UE can be signaled to the UE in the uplink grant or within RRC signaling, similar to legacy LTE. Accordingly, the base station 405c may transmit a modulation and coding scheme at 422, and orthogonal port identities at 424. Further, the base station 405c may transmit a virtual cell ID at 426, which may trigger transmission, at 428, of reference signals by the UEs 415a and 415b, such as SRS and/or DMRS.

Various additional aspects of the present disclosure provide for a unified design of SRS and uplink DMRS. In such aspects, each UE or layer for transmission can be multiplexed in either or both of FDM and TDM. Moreover, CDM may also be applied in time and/or frequency on top of the FDM/TDM multiplexing. If all of the orthogonal resources are used up, non-orthogonal DMRS sequences can be used. For example, intra-UE layers (e.g., layers of transmission associated with the same UE) can be orthogonal while inter-UE layers (e.g., layers of transmission associated with different UEs) can be non-orthogonal. The orthogonal ports assigned to each UE can be signaled to the UE in the uplink grant or within RRC based on, e.g., cell ID and/or UE ID.

In examples for support of 16 DMRS ports, varying numbers of orthogonal ports may be defined. For example, four orthogonal DMRS ports may be defined. The DMRS sequence is initialized with a physical cell ID. The intra-UE layers are orthogonal, which limits the number of intra-UE layers to four. The DMRS ports across different UEs are non-orthogonal due to the use of different sequences.

In another example, 16 DMRS ports may be shared across all eNBs making up a coordinating set of CoMP eNBs. As in the previous example, there are four orthogonal DMRS ports defined. The main difference is that all 16 DMRS ports are initialized with a virtual cell ID.

In a third example, all 16 DMRS ports may be defined as orthogonal. Here, the DMRS sequence may be initialized using either a physical cell ID or virtual cell ID.

Regarding design of reference signals for SRS and uplink DMRS in NR-SS networks, various aspects provide options using TDM/FDM and CDM (in frequency and/or time) for UE/port multiplexing. A virtual cell ID for SRS transmissions is introduced to allow for flexible multiplexing of SRS across cells. These solutions can be used for other NR-SS reference signals, e.g., downlink DMRS, as well.

Upon receipt, by the base station, of the uplink reference signals in the identified subframe from the UEs 415a and/or 415b, the base station 405c may use the received uplink reference signals to identify a transmit precoder of the UEs 415a and 415b, and transmit data, at 430, to the UEs 415a and 415b that is precoded using the transmit precoder. Base stations 405A and 405B may also receive the uplink reference signals, identify the precoder, and transmit the data using the precoder. Although depicted as macro base stations, it should be understood that base stations 405A-405C may be any type of base station.

Figure 5:
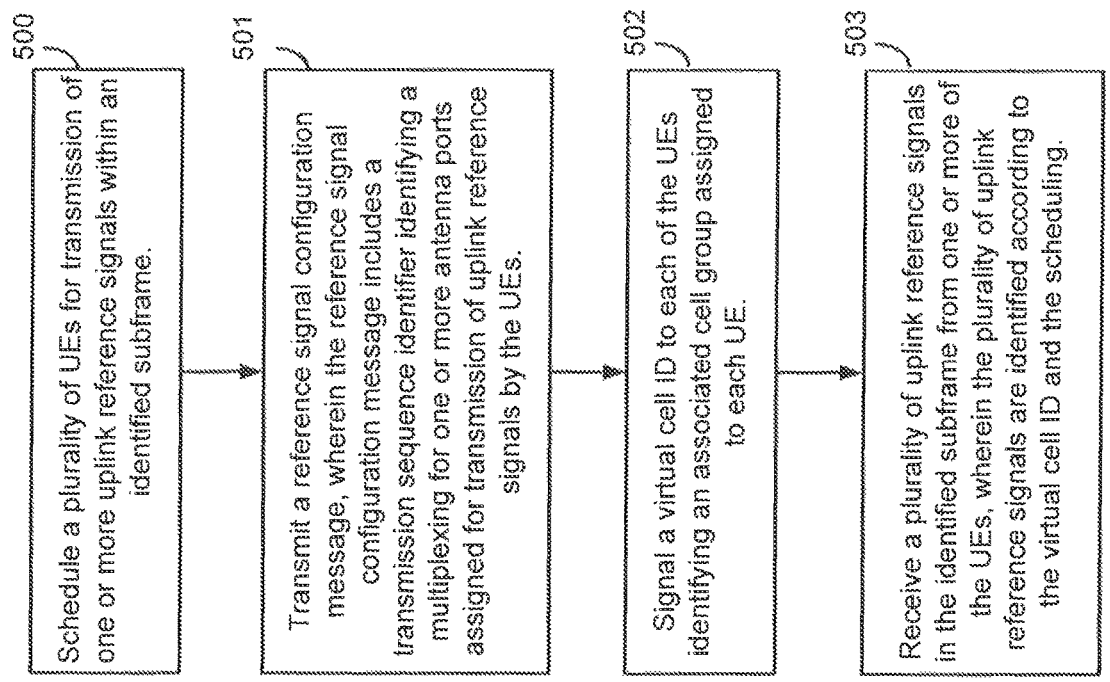
FIG. 5 is a functional block diagram illustrating exemplary blocks executed to implement aspects of the present disclosure.

Turning to FIG. 5, the operational process of the base station regarding support of multiplexing for antenna ports assigned for transmission of uplink reference signals is described in greater detail. Beginning at block 500, the process may begin with scheduling, by the base station, a plurality of user equipments (UEs) for transmission of one or more uplink reference signals within an identified subframe. Processing may proceed from block 500 to 501.

At block 501, the process may include transmitting, by the base station, a reference signal configuration message. The reference signal configuration message includes a transmission sequence identifier identifying a multiplexing for one or more antenna ports assigned for transmission of the one or more uplink reference signals by the plurality of UEs. The multiplexing is one or both of frequency divisional multiplexing (FDM) and time division multiplexing (TDM) over the identified subframe. Processing may proceed from block 501 to block 502.

At block 502, the process may include signaling a virtual cell identifier (ID) to each of the plurality of UEs identifying an associated cell group assigned to each of the plurality of UEs, wherein the associated cell group is served by a combination of the base station and one or more neighbor base stations. The base station may group the UEs into multiple different cell groups. Each UE of the cell group would receive a virtual cell ID, in case the UEs have different physical cell IDs. The cell group may be served by multiple base stations. Processing may proceed from block 502 to block 503.

At block 503, the process may include receiving, at the base station, a plurality of uplink reference signals in the identified subframe from one or more of the plurality of UEs, wherein the plurality of uplink reference signals are identified according to the virtual cell ID and the scheduling. Following block 503, the process may end.

The multiplexing may include a code divisional multiplexing (CDM) for the one or more antenna ports onto the one or both of the FDM and the TDM for the one or more antenna ports in the identified subframe. In this case, the process may include signaling, by the base station, a modulation coding scheme (MCS) to each of the plurality of UEs, wherein the MCS identifies one or more layers for transmission by a corresponding one of the plurality of UEs. The process may also include allocating, by the base station, a plurality of transmission resources to the plurality of UEs for the transmission of the one or more uplink reference signals, wherein the multiplexing for the one or more antenna ports is for each of the one or more layers for the transmission. The process may further include transmitting, by the base station, an orthogonal port identifier to the plurality of UEs identifying one or more orthogonal ports of the plurality of transmission resources that are assigned to the plurality of UEs.

In the above case of CDM, it is envisioned that, according to one alternative, the processing may include assigning, by the base station, the one or more orthogonal ports for at least the one or more layers identified for a same UE of the plurality of UEs. According to this alternative, the processing may also include assigning, by the base station, one or more non-orthogonal ports of the plurality of transmission resources for one or more different layers identified for different UEs of the plurality of UEs, when the one or more orthogonal ports are fewer than all of the plurality of transmission resources.

In the above case of CDM, it is also envisioned that, according to another alternative, the processing may include assigning, by the base station, a same base sequence for the one or more uplink reference signals in the one or more orthogonal ports to the same UE. According to this alternative, the processing may also include assigning, by the base station, a different base sequence for the one or more uplink reference signals in the one or more non-orthogonal ports for the different UEs. Optionally, the processing may include decoding, by the base station, the plurality of uplink reference signals from the one or more of the plurality of UEs initiated by a virtual cell identifier, wherein the one or more of the plurality of UEs are served by a combination of the base station and one or more neighbor base stations. As another option, the processing may include decoding, by the base station, the plurality of uplink reference signals from the one or more plurality of UEs initiated by one of: a physical cell identifier; or one of: the physical cell identifier or a virtual cell identifier, when the one or more orthogonal ports equals the plurality of transmission resources.

It is also envisioned that the reference signal configuration message may include identification of a set of cyclic shifts, and the one or more uplink reference signals may be multiplexed with a different cyclic shift selected from the set of cyclic shifts when two or more antenna ports are scheduled for a same transmission resource. In this case, the process may include grouping, by the base station, ones of the plurality of UEs into two or more cell groups served by a combination of the base station and one or more neighbor base stations. The process may also include signaling, by the base station, a virtual cell identifier (ID) to each of the plurality of UEs identifying an associated group of the two or more cell groups assigned to each of the plurality of UEs. The process may further include assigning, by the base station, a same base sequence for the one or more uplink reference signals to each UE of a cell group of the two or more cell groups.

Figure 6:
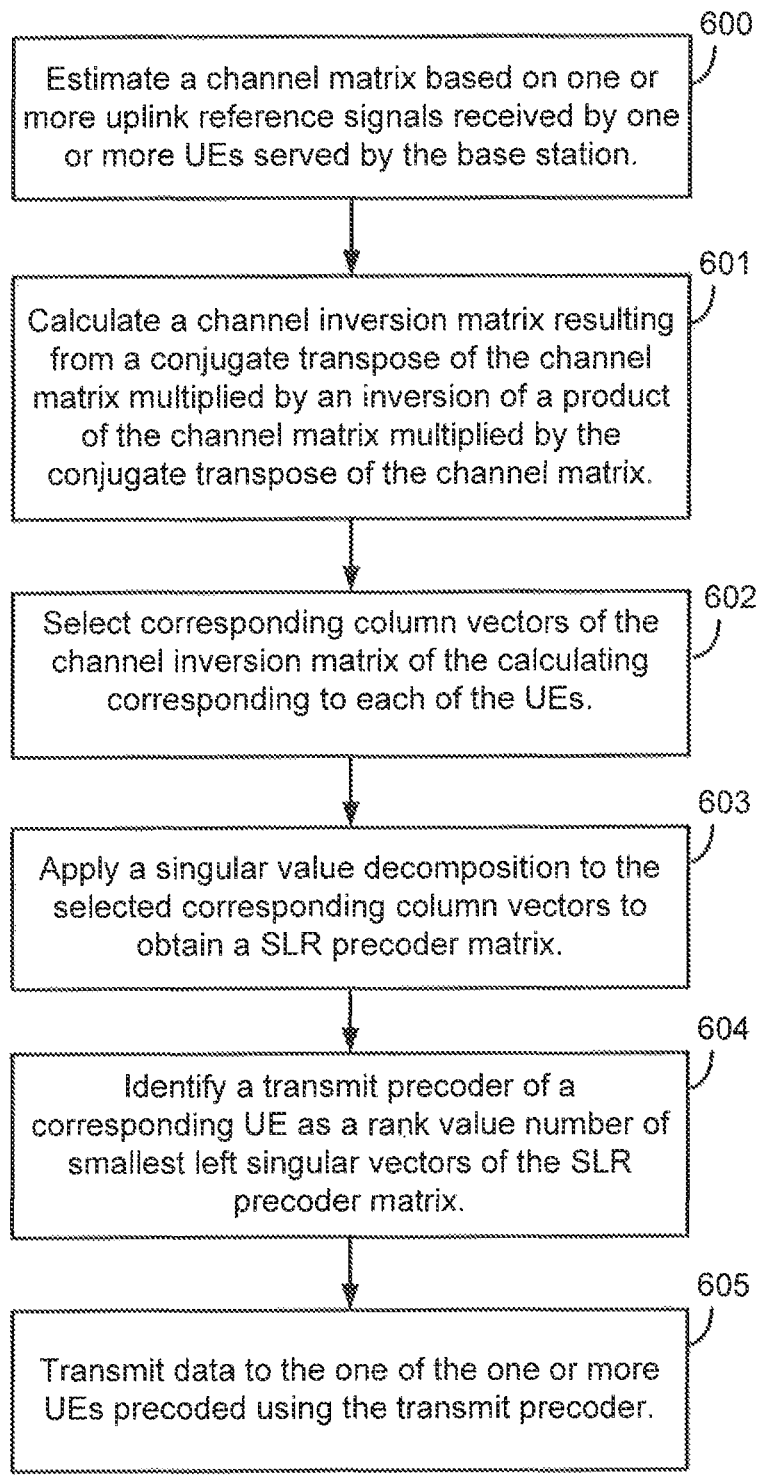
FIG. 6 is a functional block diagram illustrating exemplary blocks executed to implement other aspects of the present disclosure.

Turning to FIG. 6, the operational process of the base station regarding identification of the transmit precoder is described in greater detail. Beginning at block 600, the process includes estimating, by the base station, a channel matrix based on one or more uplink reference signals received by one or more user equipments (UEs) served by the base station. Processing may proceed from block 600 to block 601.

At block 601, the process includes calculating, by the base station, a channel inversion matrix resulting from a conjugate transpose of the channel matrix multiplied by an inversion of a product of the channel matrix multiplied by the conjugate transpose of the channel matrix. Processing may proceed from block 601 to block 602.

At block 602, the process includes selecting, by the base station, corresponding column vectors of the channel inversion matrix of the calculating corresponding to each of the one or more UEs. Processing may proceed from block 602 to block 603.

At block 603, the process includes applying, by the base station, a singular value decomposition to the selected corresponding column vectors to obtain a signal-to-leakage ratio (SLR) precoder matrix. Processing may proceed from block 603 to block 604.

At block 604, the process includes identifying, by the base station, a transmit precoder of the one of the one or more UEs as a rank value number of smallest left singular vectors of the SLR precoder matrix. Processing may proceed from block 604 to block 605.

At block 605, the process includes transmitting, by the base station, data to the one of the one or more UEs precoded using the transmit precoder. After block 605, processing may end.

It is envisioned that, in one alternative, the above process may include identifying, by the base station, a receiver precoder of the one of the one or more UEs as a downlink transmit precoder of the base station, wherein the downlink transmit precoder includes the rank value number of smallest left singular vectors of the SLR precoder matrix. As a further option, the process may include selecting a precoding matrix indicator, by the base station, wherein the precoding matrix indicator selected is equivalent to the identified uplink transmit precoder. According to this option the process may include transmitting, by the base station, the precoding matrix indicator to the one of the one or more UEs, wherein the uplink precoder is the precoding matrix indicator. As another option, the process may include transmitting one or more downlink reference signals precoded using the transmit precoder to the one of the one or more UEs, and transmitting one or more non-precoded downlink reference signals. Additional details regarding these and other options are provided below.

On the downlink side, without loss of generality, assume there are K UEs and one eNB. Stated differently, all CoMP eNBs are together as only one eNB. The communication system is given by $$\begin{bmatrix} Y_1 \\ \vdots \\ Y_i \\ \vdots \\ Y_K \end{bmatrix} = HX + Z, H = \begin{bmatrix} H_1 \\ \vdots \\ H_i \\ \vdots \\ H_K \end{bmatrix}, X = [W_1 \ \ldots \ W_i \ \ldots \ W_K] \begin{bmatrix} S_1 \\ \vdots \\ S_i \\ \vdots \\ S_K \end{bmatrix}$$

Capacity region of this channel is obtained by Dirty Paper Coding. Some UEs need to decode signals from other UEs first and subtract from received signals sequentially until they can decode their own message. This approach is not practical due to high overhead. Recalling that, in SU-MIMO, in which the optimal precoder for each layer is such that the received layers are orthogonal at the receiver space:

$Y=HX+Z$

From svd decomposition$\rightarrow H=U\Lambda V^H \rightarrow X=VS \rightarrow Y=U\Lambda S+Z$, wherein S is a vector of symbols transmitted over different layers.

Inspired by this optimal precoder, the present disclosure proposes a simplified precoding design for DL CoMP. For this design, one may assume $\Sigma_i^K N_i \leq M$, where $N_i$ is the number of Rx antenna at UE i and M is total number of eNB antennas. This assumption, as well as the number of layers transmitted by each UE, is optional. Another assumption may be that $H_i H_i^H$ is full rank (i.e., inverse exists). This assumption is also optional.

A problem may be defined to obtain Tx ($W_{Ti}$) and Rx ($W_{Ri}$) precoders for each UE i: Problem I:

$$\max_{W_{Ti}, W_{Ri}} \|W_{Ri}^H H_i W_{Ti}\|^2,$$

such that $\text{span}\{W_{Ti}\} \perp \text{span}\{H_{\bar{i}}^H\}$ and $W_{Ti}^H W_{Ti}=1$ and $W_{Ri}^H W_{Ri}=I$. $H_{\bar{i}}$ represents the concatenated channel from all UEs except i.

$H_{\bar{i}}^H = [H_1^H \ldots H_{i-1}^H H_{i+1}^H \ldots H_K^H]$

Orthogonality constraints in Problem I assures achievability of what is called Block Diagonalization. The optimal solution for that problem may be obtained as: $W_{Ti}$ is the $r_i$ left singular vectors, corresponding to the $r_i$ largest singular values, of $P_{H_{\bar{i}}^H}^\perp H_i^H$. $P_{H_{\bar{i}}^H}^\perp H_i^H$ is the projection of $H_i^H$ into the null space of $H_{\bar{i}}^H$, where $P_{H_{\bar{i}}^H}^\perp = I - H_{\bar{i}}^H (H_{\bar{i}} H_{\bar{i}}^H)^{-1} H_{\bar{i}}$ and $r_i$ represents number of layers for UE i.

$W_{Ri}$ is the $T_i$ right singular vectors, corresponding to the $r_i$ largest singular values, of $P_{H_{\bar{i}}^H}^\perp H_i^H$. Right singular vectors of $P_{H_{\bar{i}}^H}^\perp H_i^H$ and left singular vectors of $H_i$ $W_{Ti}$ are the same (unless they are Hermitian'ed).

Of note, the eNB does not need to obtain the projection matrices to the number of UEs. Consider $H^H(HH^H)^{-1}$, from block matrix inversion lemmas, it follows:

$H^H(HH^H)^{-1} = [P_{H_{\bar{1}}^H}^\perp H_1^H (H_1 P_{H_{\bar{1}}^H}^\perp H_1^H)^{-1} \ldots P_{H_{\bar{i}}^H}^\perp H_i^H (H_i P_{H_{\bar{i}}^H}^\perp H_i^H)^{-1} \ldots P_{H_{\bar{K}}^H}^\perp H_K^H (H_K P_{H_{\bar{K}}^H}^\perp H_K^H)^{-1}]$ At Step1: eNB calculates $H^H(HH^H)^{-1}$. At Step2: For each UE i: 2-1: pick the corresponding columns of $H^H(HH^H)^{-1} \rightarrow W_{ia} = P_{H_{\bar{i}}^H}^\perp H_i^H (H_i P_{H_{\bar{i}}^H}^\perp H_i^H)^{-1}$, and 2-2: Apply svd$\rightarrow W_{ia} = U_i \Delta_i V_i^H$. $W_{Ti}$ is the $r_i$ left singular vectors of $W_{ia}$ corresponding to the $r_i$ smallest singular values. $W_{Ri}$ is the $r_i$ right singular vectors of $W_{ia}$ corresponding to the $r_i$ smallest singular values.

It should be noted that $W_{ia}$ used to be called SLR precoder (it is indeed pure block diagonalization). Recall left singular vectors of $P_{H_{\bar{i}}^H}^\perp H_i^H$ are required. $W_{ia}$ and $P_{H_{\bar{i}}^H}^\perp H_i^H$ have the same left and right singular vectors but inverted singular values.

On the uplink side, without loss of generality, assume K UEs and one eNB. Stated differently, all CoMP eNBs are together as only one eNB. The received signal at the eNB is given by:

$$Y = [H_1 \ldots H_i \ldots H_K] \begin{bmatrix} X_1 \\ \vdots \\ X_i \\ \vdots \\ X_K \end{bmatrix} + Z,$$

where, without loss of generality $E\{ZZ^H\}=I$. The capacity region of this channel is obtained by successive interference cancellation at the eNB, but all UEs should have channel knowledge of all UL channels. This option is also not practical due to high overhead.

Recalling that, in SU-MIMO, the optimal precoder for each layer is such that the received layers are orthogonal at the receiver space:

$Y=HX+Z$

From svd decomposition$\rightarrow H=U\Lambda V^H \rightarrow X=VS \rightarrow Y=U\Lambda S+Z$, where S is a vector of symbols transmitted over different layers.

Inspired by this optimal precoder, the present disclosure provides a simplified precoding design for UL CoMP. For this design, one may assume $\Sigma_i^K N_i \leq M$, where $N_i$ is the number of Tx antenna at UE i and M is the total number of receive antennas. This assumption, as well as the number of layers transmitted by each UE, is optional. Another assumption may be that $H_i^H H_i$ is full rank (i.e., inverse exists). This assumption is also optional.

The second problem may be expressed as: Problem II:

$$\max_{W_{Ri}, W_{Ti}} \|W_{Ri}^H H_i W_{Ti}\|^2,$$

such that $\text{span}\{W_{Ri}\} \perp \text{span}\{H_{\bar{i}}\}$ and $W_{Ri}^H W_{Ri}=I$ and $W_{Ti}^H W_{Ti}=I$. $H_{\bar{i}}$ represents the concatenated channel from all UEs except i. $H_{\bar{i}}=[H_1 \ldots H_{i-1} H_{i+1} \ldots H_K]$. Orthogonality constraints in Problem II assure orthogonal receive subspaces for different UEs. $W_{Ri}$ is the $r_i$ left singular vectors, corresponding to the $r_i$ largest singular values, of $P_{H_{\bar{i}}}^\perp H_i$. $P_{H_{\bar{i}}}^\perp H_i$ is the projection of $H_i$ into the null space of $H_{\bar{i}}$, where $P_{H_{\bar{i}}}^\perp = I - H_{\bar{i}} (H_{\bar{i}}^H H_{\bar{i}})^{-1} H_{\bar{i}}^H$. $r_i$ represents number of layers for UE i. $W_{Ti}$ is the $r_i$ right singular vectors, corresponding to the $r_i$ largest singular values, of $P_{H_{\bar{i}}}^\perp H_i$. Right singular vectors of $P_{H_{\bar{i}}}^\perp H_i$ and right singular vectors of $W_{Ri}^H H_i$ are the same.

It should be noted that, similar to DL, all precoders can be obtained by a single, large matrix inversion. Problem II in UL is the dual of Problem I for DL; more precisely, $W_{Ti}^{DL} = W_{Ri}^{UL}$ and $W_{Ti}^{UL} = W_{Ri}^{DL}$.

For the base station to decode UE i, the received signal at eNB is given by $$Y = H_{eq} \begin{bmatrix} S_1 \\ \vdots \\ S_i \\ \vdots \\ S_K \end{bmatrix} + Z$$

$H_{eq} = [H_1 W_{T1} \; H_2 W_{T2} \ldots H_i W_{Ti} \ldots H_K W_{TK}]$

It may also be taken that span$\{W_{Ri}\} \perp$ span$\{H_{\overline{i}}\}$, where $H_{\overline{i}}=[H_1 \ H_2 \ \ldots \ H_{i-1} \ H_{i+1} \ \ldots \ H_K]$ and $Y_{ieq}=W_{Ri}{}^H Y = W_{Ri}{}^H H_i W_{Ti} S_i + Z_{ieq} = W_{Ri}{}^H P_{H_{\overline{i}}}{}^{\perp} H_i W_{Ti} S_i + Z_{ieq} = \Delta_i S_i + Z_{ieq}$, where $\Delta_i$ is diagonal and represents the $r_i$ largest singular values of $P_{H_{\overline{i}}}{}^{\perp} H_i$. $r_i$: number of layers in UE i ($r_i \leq N_i$).

The base station may signal the precoders to the UEs in various different manners. A first option may be codebook based. An eNB picks a PMI for which the equivalent channel, span$\{H_i P_i\} \approx$ span$\{H_i W_{Ti}\}$.

A second option may be precoder based. For example, a UE may get an approximate idea about the precoder by comparing precoded DMRS/CSI-RS with un-precoded DMRS/CSI-RS. In such an aspect, the eNB may transmit both precoded DMRS/CSI-RS and un-precoded DMRS/CSI-RS. In another, optional, precoder based implementation, the eNB may transmit just the precoded DMRS/CSI-RS. In such an aspect, assume $H_i$ is the UL channel→$H_i^T$ is the DL channel→eNB sends precoded CSI-RS with $W_{Ri}^*$. The DL channel UE i measures from precoded CSI-RS can be written as: $H_i^T W_{Ri}^* = (H_i^H W_{Ri})^*$. From projection properties: $I = P_{H_{\overline{i}}}{}^{\perp} + P_{H_{\overline{i}}} \rightarrow H_i^H W_{Ri} = H_i^H (P_{H_{\overline{i}}}{}^{\perp} + P_{H_{\overline{i}}}) W_{Ri} = H_i^H P_{H_{\overline{i}}}{}^{\perp} W_{Ri} = W_{Ti} \Delta_i$. Thus: $H_i^T W_{Ri}^* = (W_{Ti} \Delta_i)^* = W_{Ti}^* \Delta_i$. The UE thus obtains the UL precoder $W_{Ti}$ from the precoded CSI-RS.

Figure 7:
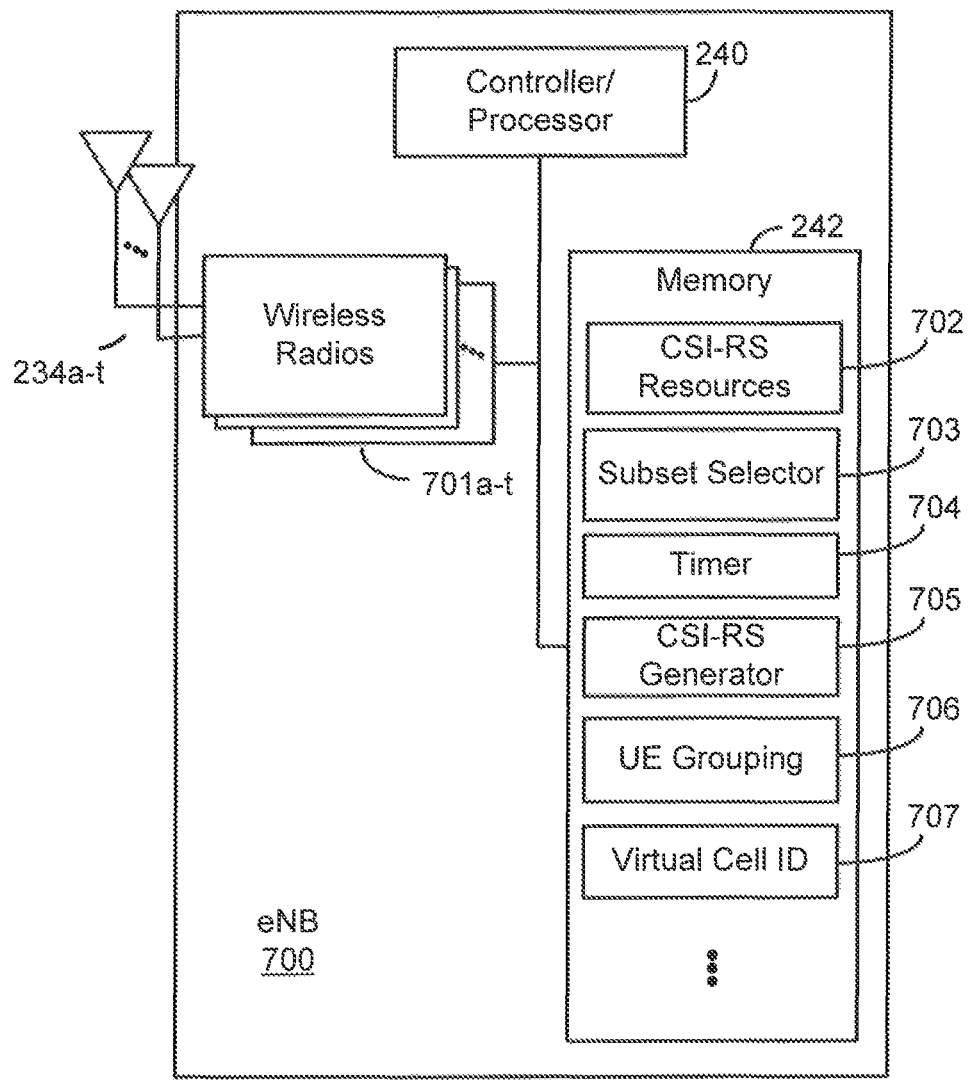
FIG. 7 is a block diagram of a base station in a communication network according to one aspect of the present disclosure.

FIG. 7 is a block diagram of a base station 700 in a communication network according to one aspect of the present disclosure. Base station 700 may include controller/processor 240 to perform or direct the execution of various processes or program codes stored in memory 242. Base station 700 may further include wireless radios 701a-t to process uplink or downlink signals received from antennas 234a-t. Memory 242 may store CSI-RS resources 702 and program codes for execution of subset selector 703, timer 704, CSI-RS generator 705, UE grouping logic 706, virtual cell ID generator 707, or other modules/applications. CSI-RS resources may store a set of resources to be used for CSI-RS. Subset selector 703, Timer 704, CSI-RS generator 705, UE grouping logic 706, and virtual cell ID generator 707 may cause controller processor 240 to operate in accordance with processes described above with reference to FIGS. 4A, 4B, 5, and/or 6.

Figure 8:
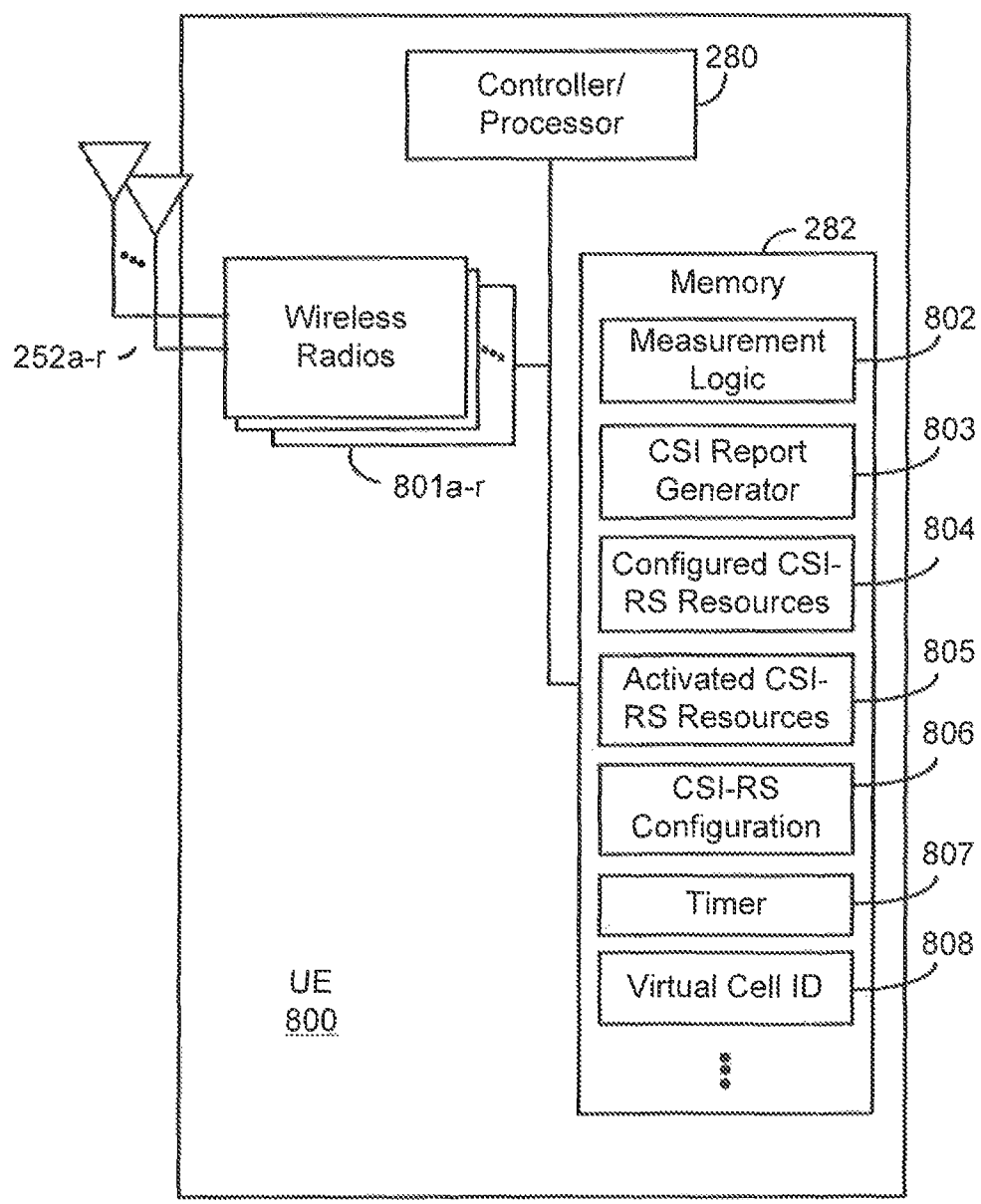
FIG. 8 is a block diagram of a UE in a communication network according to one aspect of the present disclosure.

FIG. 8 is a block diagram of a UE 800 in a communication network according to one aspect of the present disclosure. UE 800 may include controller/processor 280 to perform or direct the execution of various processes or program codes stored in memory 282. UE 800 may further include wireless radios 801a-r to process uplink or downlink signals received from antennas 252a-r. Memory 282 may store measurement logic 802, CSI report generator 803, configured CSI-RS resources 804, activated CSI-RS resources 805, CSI-RS configuration 806, timer 807, virtual cell ID 808, and other logic/applications. Measurement logic 802, CSI report generator 803, configured CSI-RS resources 804, activated CSI-RS resources 805, CSI-RS configuration 806, timer 807, and virtual cell ID 808 may cause controller processor 282 to operate in accordance with processes described above with reference to FIGS. 4A, 4B, 5, and/or 6.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A, and 5-6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a User Equipment (UE) from a base station, a reference signal configuration message, wherein the reference signal configuration message comprises a transmission sequence identifier identifying a multiplexing for one or more antenna ports assigned for transmission of one or more uplink reference signals by a plurality of UEs, and wherein the multiplexing is one or both of frequency divisional multiplexing (FDM) and time division multiplexing (TDM) over an identified subframe;
   receiving, by the UE from the base station, a virtual cell identifier (ID) different from a physical cell identifier;
   configuring, by the UE, an uplink reference signal of the one or more uplink reference signals, wherein a number of OFDM symbols for carrying the uplink reference signal is configured based on the reference signal configuration message; and
   transmitting, by the UE to the base station, the uplink reference signal in the identified subframe, wherein the uplink reference signal is identified by the base station according to the virtual cell ID.

2. The method of claim 1, wherein the virtual cell ID identifies an associated cell group assigned to the UE and the associated cell group is served by a combination of the base station and one or more neighbor base stations.

3. The method of claim 1, wherein the multiplexing further comprises a code divisional multiplexing (CDM) for the one or more antenna ports onto the one or both of the FDM and the TDM for the one or more antenna ports in the identified subframe.

4. The method of claim 1, wherein the reference signal configuration message comprises identification of a set of cyclic shifts, and wherein the one or more uplink reference signals are multiplexed with a different cyclic shift selected from the set of cyclic shifts when two or more antenna ports are scheduled for a same transmission resource.

5. The method of claim 2, wherein the plurality of UEs are grouped into two or more cell groups served by the combination of the base station and the one or more neighbor base stations and the associated cell group is selected from the two or more cell groups, and wherein uplink reference signals for UEs of the associated cell group are assigned a same base sequence.

6. The method of claim 3, further comprising:
   receiving, by the UE from the base station, a modulation coding scheme (MCS) that identifies one or more layers for transmission by the UE;
   receiving, by the UE from the base station, allocation of transmission resources for the transmission of the uplink reference signal, wherein the multiplexing for the one or more antenna ports is for each of the one or more layers for the transmission; and
   receiving, by the UE from the base station, an orthogonal port identifier identifying an orthogonal port of the transmission resources that are assigned to the UE.

7. The method of claim 6,
   wherein one or more orthogonal ports are assigned for at least the one or more layers identified for a same UE of a plurality of UEs; and
   wherein one or more non-orthogonal ports of the plurality of transmission resources are assigned for one or more different layers identified for different UEs of the plurality of UEs, when the one or more orthogonal ports are fewer than all of the plurality of transmission resources.

8. The method of claim 7,
   wherein a same base sequence is assigned for the one or more uplink reference signals in the one or more orthogonal ports to the same UE; and
   wherein a different base sequence is assigned for the one or more uplink reference signals in the one or more non-orthogonal ports for the different UEs.

9. The method of claim 1, wherein the uplink reference signal is configured with two or more OFDM symbols or three or more comb patterns based on the reference signal configuration message.

10. An apparatus configured for wireless communication, comprising:
    means for receiving, by a User Equipment (UE) from a base station, a reference signal configuration message, wherein the reference signal configuration message comprises a transmission sequence identifier identifying a multiplexing for one or more antenna ports assigned for transmission of one or more uplink reference signals by a plurality of UEs, and wherein the multiplexing is one or both of frequency divisional multiplexing (FDM) and time division multiplexing (TDM) over an identified subframe;

means for receiving, by the UE from the base station, a virtual cell identifier (ID) different from a physical cell identifier;

configuring, by the UE, an uplink reference signal of the one or more uplink reference signals, wherein a number of OFDM symbols for carrying the uplink reference signal is configured based on the reference signal configuration message; and means for transmitting, by the UE to the base station, the uplink reference signal in the identified subframe, wherein the uplink reference signal is identified by the base station according to the virtual cell ID.

11. The apparatus of claim 10, wherein the virtual cell ID identifies an associated cell group assigned to the UE and the associated cell group is served by a combination of the base station and one or more neighbor base stations.

12. The apparatus of claim 10, wherein the means for multiplexing further comprises means for a code divisional multiplexing (CDM) for the one or more antenna ports onto the one or both of the FDM and the TDM for the one or more antenna ports in the identified subframe.

13. The apparatus of claim 10, wherein the reference signal configuration message comprises identification of a set of cyclic shifts, and wherein the one or more uplink reference signals are multiplexed with a different cyclic shift selected from the set of cyclic shifts when two or more antenna ports are scheduled for a same transmission resource.

14. The apparatus of of claim 11, wherein the plurality of UEs are grouped into two or more cell groups served by the combination of the base station and the one or more neighbor base stations and the associated cell group is selected from the two or more cell groups, and uplink reference signals for UEs of the associated cell group are assigned a same base sequence.

15. The apparatus of claim 12, further comprising:

means for receiving, by the UE from the base station, a modulation coding scheme (MCS) that identifies one or more layers for transmission by the UE;

means for receiving, by the UE from the base station, allocation of transmission resources for the transmission of the uplink reference signal, wherein the multiplexing for the one or more antenna ports is for each of the one or more layers for the transmission; and means for receiving, by the UE from the base station, an orthogonal port identifier identifying an orthogonal port of the transmission resources that are assigned to the UE.

16. The apparatus of claim 15, wherein one or more orthogonal ports are assigned for at least the one or more layers identified for a same UE of the plurality of UEs; and wherein one or more non-orthogonal ports of the plurality of transmission resources are assigned for one or more different layers identified for different UEs of the plurality of UEs, when the one or more orthogonal ports are fewer than all of the plurality of transmission resources.

17. The apparatus of claim 16, wherein a same base sequence is assigned for the one or more uplink reference signals in the one or more orthogonal ports to the same UE; and wherein a different base sequence is assigned for the one or more uplink reference signals in the one or more non-orthogonal ports for the different UEs.

18. The apparatus of claim 10, wherein the uplink reference signal is configured with two or more OFDM symbols or three or more comb patterns based on the reference signal configuration message.

19. A non-transitory computer-readable medium having program code recorded thereon, the program code comprising:

program code executable by a computer for causing the computer to receive, by a User Equipment (UE) from a base station, a reference signal configuration message, wherein the reference signal configuration message comprises a transmission sequence identifier identifying a multiplexing for one or more antenna ports assigned for transmission of one or more uplink reference signals by a plurality of UEs, and wherein the multiplexing is one or both of frequency divisional multiplexing (FDM) and time division multiplexing (TDM) over an identified subframe;

program code executable by the computer for causing the computer to receive, by the UE from the base station, a virtual cell identifier (ID) different from a physical cell identifier;

program code executable by the computer for causing the computer to configure, by the UE, an uplink reference signal of the one or more uplink reference signals, wherein a number of OFDM symbols for carrying the uplink reference signal is configured based on the reference signal configuration message; and program code executable by the computer for causing the computer to transmit, by the UE to the base station, the uplink reference signal in the identified subframe, wherein the uplink reference signal is identified by the base station according to the virtual cell ID.

20. An apparatus configured for wireless communication, the apparatus comprising:

at least one processor; and a memory coupled to the at least one processor, wherein the at least one processor is configured to:

receive, by a User Equipment (UE) from a base station, a reference signal configuration message, wherein the reference signal configuration message comprises a transmission sequence identifier identifying a multiplexing for one or more antenna ports assigned for transmission of one or more uplink reference signals by a plurality of UEs, and wherein the multiplexing is one or both of frequency divisional multiplexing (FDM) and time division multiplexing (TDM) over an identified subframe;

receive, by the UE from the base station, a virtual cell identifier (ID) different from a physical cell identifier;

configure, by the UE, an uplink reference signal of the one or more uplink reference signals, wherein a number of OFDM symbols for carrying the uplink reference signal is configured based on the reference signal configuration message; and transmit, by the UE to the base station, the uplink reference signal in the identified subframe, wherein the uplink reference signal is identified by the base station according to the virtual cell ID.

* * * * *